United States Patent [19]

Reinke et al.

[11] 4,321,976

[45] Mar. 30, 1982

[54] MACHINE STEPPER

[75] Inventors: Friedrich Reinke, Gelsenkirchen; Paul Hoever, Neukirchen, both of Fed. Rep. of Germany

[73] Assignee: FRIED. KRUPP Gesellschaft mit beschränkter Haftung, Essen, Fed. Rep. of Germany

[21] Appl. No.: 120,105

[22] Filed: Feb. 8, 1980

[30] Foreign Application Priority Data

Feb. 15, 1979 [DE] Fed. Rep. of Germany ....... 2905793

[51] Int. Cl.³ ............................................. B62D 57/02
[52] U.S. Cl. ...................................... 180/8 C; 254/84
[58] Field of Search ................... 180/8 C, 8 R, 8 BA; 254/84

[56] References Cited

U.S. PATENT DOCUMENTS 2,660,253 11/1953 Davidson ............................ 180/8 C
3,830,324 8/1974 Chambers ........................... 180/8 C

FOREIGN PATENT DOCUMENTS 6751150 1/1969 Fed. Rep. of Germany .
2129197 10/1974 Fed. Rep. of Germany .

Primary Examiner—John P. Silverstrim
Attorney, Agent, or Firm—Karl F. Ross

[57] ABSTRACT

A machine stepper has a machine-supporting platform that normally stands on the floor by means of fixed support posts. A substantially rectangular frame is provided underneath this platform and can shift relative to it. This frame is constituted by a pair of generally parallel longitudinal members and a pair of generally parallel transverse members pivoted together at corners at each of which is provided a respective upright and vertically extensible leg. Two of the diagonally opposite legs pivot about respective longitudinally extending horizontal pivot axes and the other two legs pivot about respective transverse horizontal pivot axes. Cylinders are provided for horizontally shifting the frame relative to the platform so that when the legs have been extended to lift the posts of the platform off the ground these cylinders can step the platform horizontally and when the expansible legs are shortened it is set back down on the floor.

9 Claims, 5 Drawing Figures

MACHINE STEPPER

FIELD OF THE INVENTION

The present invention relates to a machine stepper. More particularly this invention concerns an apparatus usable for displacing a very heavy machine or the like a limited distance, as from one location in a shop or at a work site to another.

BACKGROUND OF THE INVENTION

In a shop it is frequently necessary to move a heavy piece of machinery a limited distance. To accomplish this it is known to provide the piece of machinery or the platform on which it is mounted with a so-called stepper that allows the piece of machinery to be moved from place to place horizontally. Such a stepper need not be capable of producing a high displacement speed, but must be capable of lifting a large load and displacing it surely and steadily.

A typical stepper is shown in our German Pat. No. 2,129,197. This arrangement has a platform that normally stands on its own legs, but has underneath itself a frame that can shift relative to the platform and that carries a plurality of upright and vertically extensible legs. These legs can be expanded downwardly, normally by pressurization of hydraulic cylinders in them, to lift the platform off the posts on which it is normally supported so that it is supported only on these extensible legs. Then another hydraulic cylinder can shift the platform relative to the frame carrying these legs so that the platform is stepped horizontally. The legs can be retracted to set the platform back down again on its posts and the frame is then shifted back to its original position, whereupon the cycle can be repeated for another step of the platform.

In this system the expansible legs are rigidly fixed on the shiftable frame underneath the platform. Thus they expand along perfectly parallel axes that are perpendicular to the displacement direction and that are all rigidly fixed relative to one another. The disadvantage of this system is that if one leg expands at a rate that is different from any of the others the frame will be twisted considerably. The same will occur if any of the cylinders used for shifting the frame relative to the platform operates at a speed that is greater or less than any of the others, or if the underlying floor or terrain is not perfectly planar. As a result the frame and other associated elements must be built extremely robustly in order to withstand these twisting forces, and control systems must be provided to ensure uniform operation of the various legs.

Another system is shown in German utility model 6,751,750, but here the legs are suspended by ball or knuckle joints directly on the platform and each expansible leg can have its lower end displaced horizontally relative to its upper end by means of a respective double-acting cylinder, with the various cylinders arranged at different angles. The disadvantage of this system is that the machine being displaced will move in short arcs, rather then simply be lifted, transported horizontally, and then dropped with each step. In addition the strain on the cylinders that horizontally displace the lower ends of the expansible legs is considerable, so that these elements must either be very heavily dimensioned or replaced frequently. Finally, the above-given disadvantages of canting or twisting of the structure in the event that some of the cylinders do not operate at the same speed as the others is also present in this system.

OBJECTS OF THE INVENTION

It is therefore an object of the present invention to provide an improved machine stepper.

Another object is to provide such a machine stepper which, even if the various legs expand at somewhat different rates and the shifting cylinders operate at different rates, will not subject any of the structure to an excessive strain.

Another object is to provide such a system which can even walk over a relatively uneven surface.

SUMMARY OF THE INVENTION

These objects are attained according to the instant invention in a machine stepper wherein a substantially rectangular frame is provided underneath and is shiftable relative to the platform. This frame is constituted by a pair of generally parallel longitudinal members and a pair of generally parallel transverse members connected at corners to the longitudinal members. The vertical extensible legs are provided at the corners and are pivoted on leg pivots that define for the respective legs horizontal pivot axes and that prevent pivoting of the legs except about the respective axes. Two of these pivots axes extend longitudinally and the other two pivot axes extend transversely. Thus in the event that part of the machine moves a little bit faster than the other, one of the legs can swing somewhat about its pivot axis, thereby eliminating undue stressing of the structure.

According to further features of this invention each of the frame members is actually formed of two parts that are pivoted together about an upright pivot axis generally at the corners. More particularly each of the members has a long portion and a short portion and each corner has the long portion of one of the respective members and the short portion of the other. In this manner the entire frame can deform somewhat in its own plane without damage, but of course will be returned to its rectangular shape at the beginning of each step.

According to further features of this invention the pivot axes of the diagonally opposite legs are parallel, so that, when standing on the expansible legs, two diagonally opposite legs will resist displacement of the frame in one horizontal direction, that is parallel to their parallel pivot axes, and the other two diagonally opposite legs will resist displacement of the frame perpendicularly.

According to further features of this invention the members of one of the pair of frame members are subdivided into two parts which are connected together at their joints so that they can twist relative to each other about the axis of the respective member. This arrangement allows the frame to twist slightly to compensate for warping of the platform it is supporting.

SPECIFIC DESCRIPTION

Figure 1:
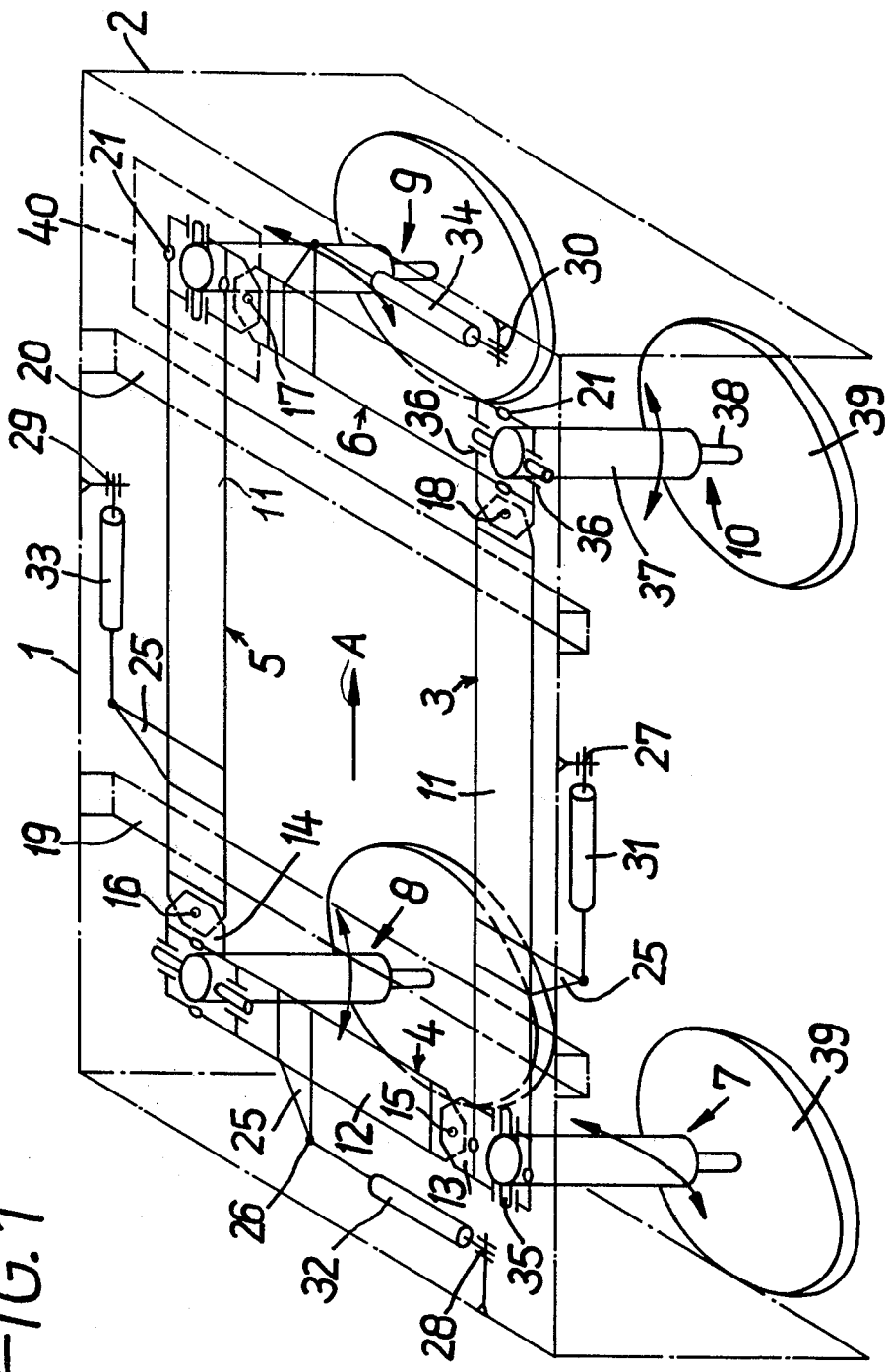
FIG. 1 is a largely schematic perspective view of a stepper according to this invention.

A stepper for a heavy piece of machinery has, as shown in FIG. 1, a table-like platform 1 having a pair of pedestal-type legs or support posts 2 by means of which it can normally stand on the floor. Provided underneath this platform 1 is a rectangular frame having a pair of longitudinal frame elements 3 and 5 and a pair of transverse elements 4 and 6 joined together at corners at which are provided upright vertically extensible legs 7–10. Each of the longitudinal frame members 3 and 5 is constituted by a relatively long portion 11 and a relatively short portion 13, and similarly each of the transverse frame members 4 and 6 is constituted by a relatively long portion 12 and a relatively short portion 14. Pivots 15, 16, 17 and 18 connect the long and short portions of the members 4, 5, 6 and 3 respectively, together for relative pivoting about respective vertical axes immediately adjacent the respective corners. The platform 1 is provided with a pair of transversely extending struts 19 and 20 that engage under the longitudinal members 3 and 5 so that the entire frame 3–6 with the legs 7–10 can hang from the platform 1.

Figure 5:
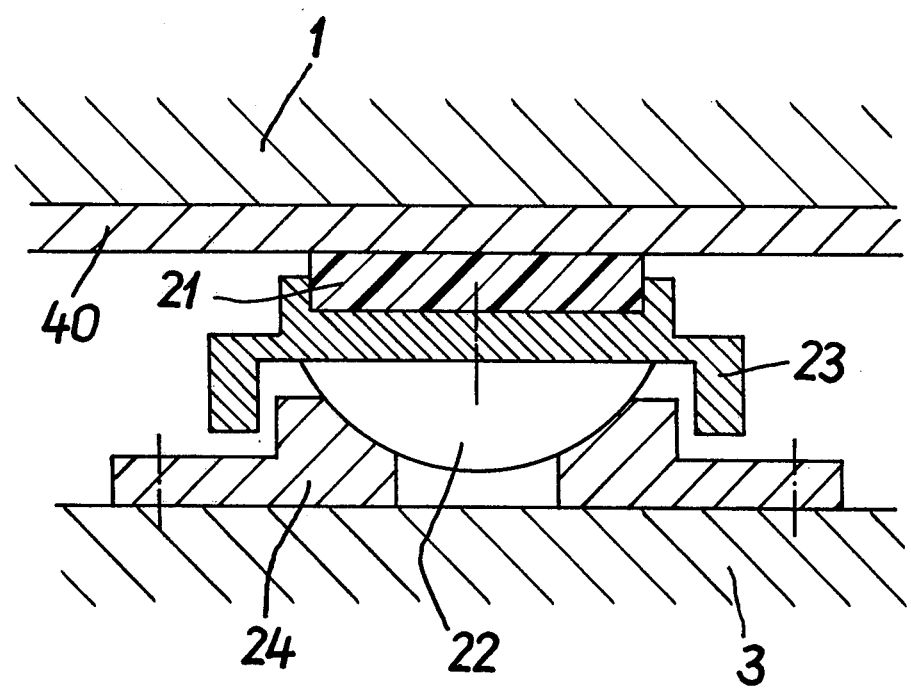
FIG. 5 is a large-scale vertical section through a detail of the stepper according to this invention.

As illustrated in FIG. 5 the members 3–6 are provided at their corners with sliding bodies 21 having a very low coefficient of friction, as for example of polytetrafluoroethylene, that ride on smooth planar slide plates 40 provided on the underside of the platform 1. These slide bodies 21 are themselves received in sockets 24 bolted to the respective frame members 3–6. Thus the platform 1 can tip limitedly relative to the frame 3–6, while still being able to slide relative thereto.

As further shown in FIG. 1 each of the members 3–6 has at its respective long part 11 or 12 an outwardly extending outrigger arm 25 to whose outer end 26 is pivoted the piston rod of a respective hydraulic cylinder 31–34 whose cylinder is secured to a respective abutment 27–30 on the platform 1. Expansion of the longitudinally extending cylinder 31 and 33 will displace the platform 1 longitudinally in the direction of arrow A relative to the frame 3–6. Pressurization of the cylinders 32 and 34 will be able similarly to displace the platform 1 and frame 3–6 transversely relative to each other. Cylinders 31–34 are double-acting.

Each of the legs 7–10 is pivoted at its upper end on a respective axis-defining pivot pin 35 in a bearing 36 formed at the respective corner of the frame 3–6. The pins 35 of the legs 7 and 9 extend longitudinally, that is parallel to the direction of the arrow A, and the pins 35 of the legs 8 and 10 extend transversely and perpendicular to the other pins. Thus the diagonally opposite legs can pivot about parallel axes. Each of these legs incorporates a double-acting hydraulic cylinder 37 having a piston rod 38 carrying by means of a ball or knuckle joint a footplate 39 that is adapted to engage against the ground or floor underneath the platform 1.

In use the platform 1 is stepped along the ground by expanding all of the cylinders 37 to lift the platform 1 with its pedestals or feet 2 up off the ground or floor on which it stands. The cylinders 31 and 33 are then operated to displace the platform 1 longitudinally on the frame 3–6 or the cylinders 32 and 34 are pressurized to displace it transversely. During such displacement the platform 1 slides by means of the smooth friction plates 40 on the blocks 21 provided at the corners of the frame 3–6.

Figure 2:
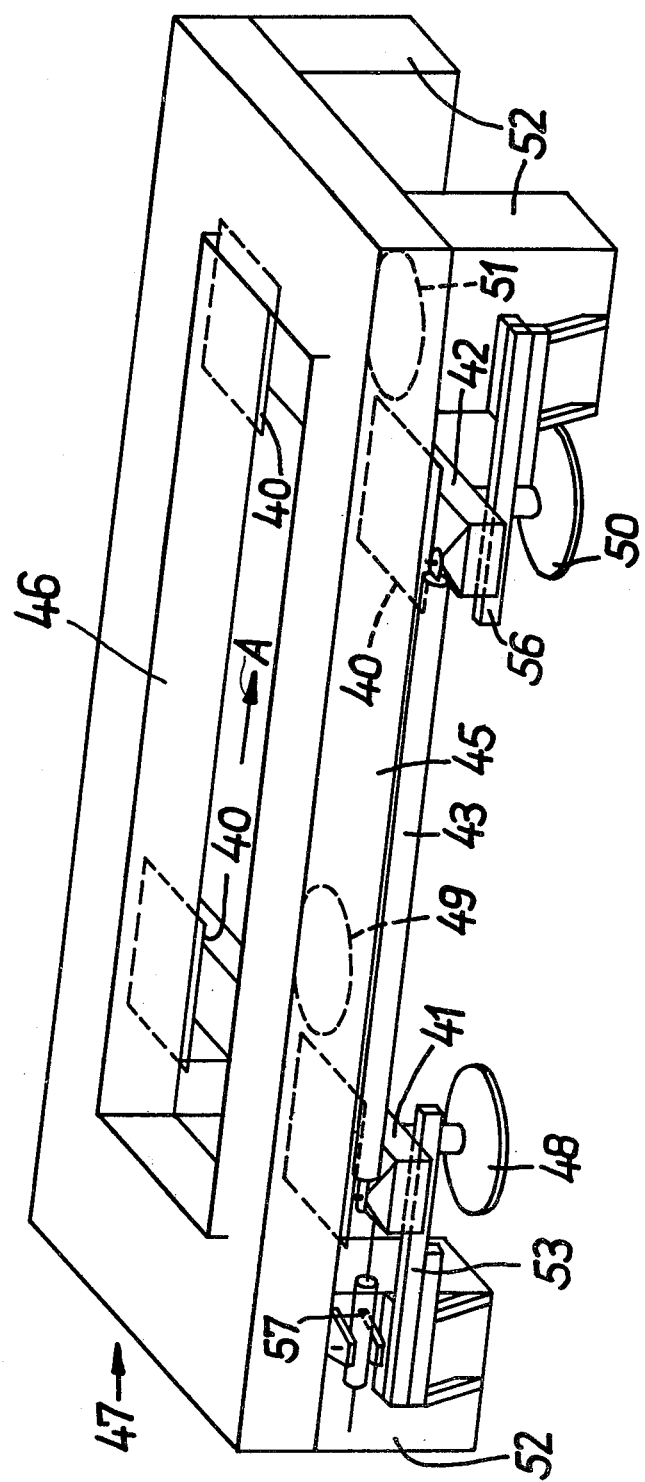
FIG. 2 is a similar view of another stepper according to this invention.
Figure 3:
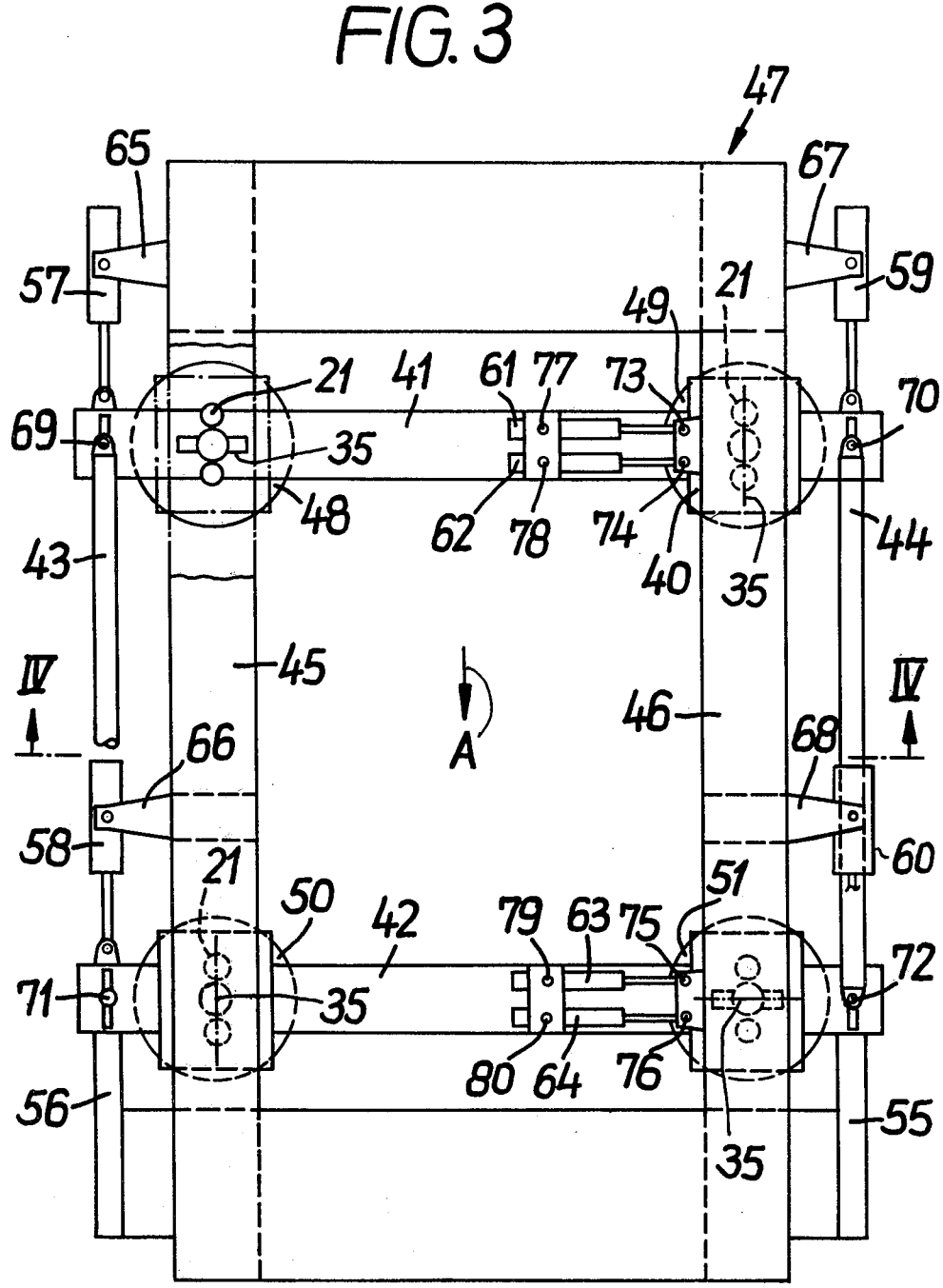
FIG. 3 is a bottom view of the stepper of FIG. 2.
Figure 4:
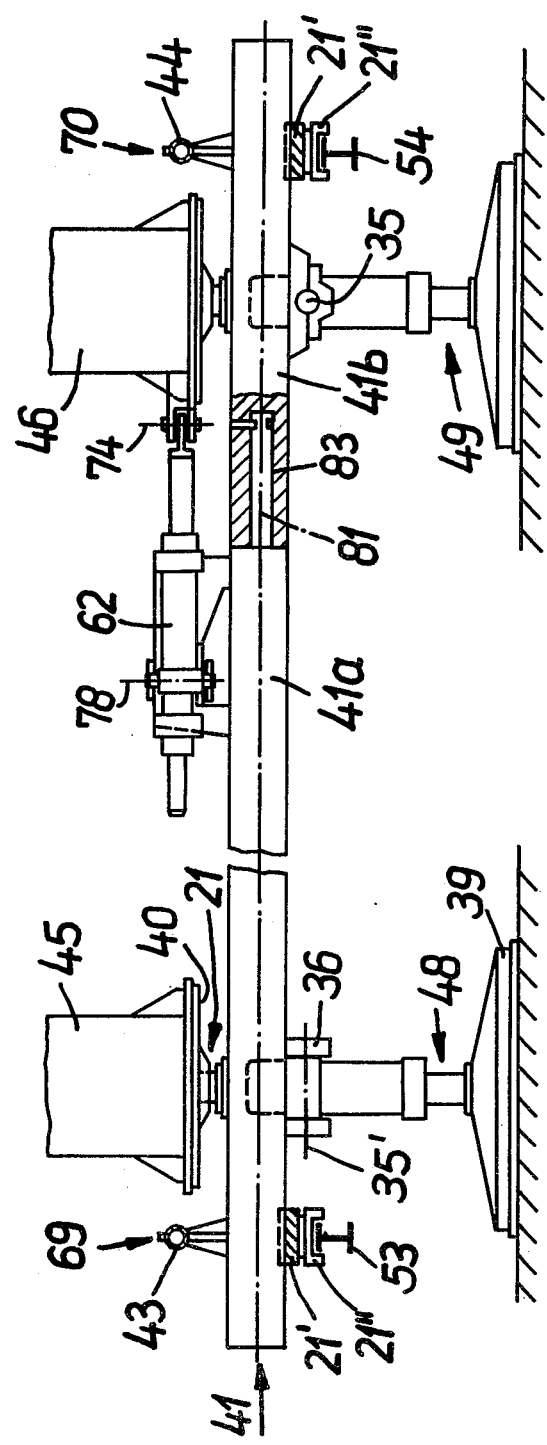
FIG. 4 is a section taken along IV—IV of FIG. 3.

In FIGS. 2–4 reference numerals identical to those of FIG. 1 represent identical structure. Here the frame is constituted by a pair of heavy-duty support beams 41 and 42 which are pivoted together by means of relatively light longitudinal frame members or links 43 and 44. The platform 47 here has a pair of heavy-duty longitudinal beams 45 and 46 and has at its outer corners posts or legs 52. The transverse beams 41 and 42 of the frame 41–44 support at the corners vertically expansible legs 48–51 substantially identical to the legs 7–10 of FIG. 1. Longitudinally projecting outriggers or bars 53–56 carried on the four legs 52 engage underneath the outer ends of the transverse beams 41 and 42 and serve to support these beams 41 and 42 when the legs 48–51 are fully retracted. Longitudinally effective hydraulic cylinders 57–60 engage the outer ends of the beams 41 and 42 and are secured on the platform 47 at struts 65–68 so that they can displace the frame 41–44 longitudinally in direction A relative to the platform 47. In addition two cylinders 61 and 62 at the leg 49 and two further cylinders 63 and 64 at the leg 51 can serve for transverse displacement. The cylinders 61–64 are pivoted on the transverse beams 41 and 42 at respective upright pivot axes 77–80 and are pivoted on flanges of the longitudinal portion 46 of the platform 47 at respective upright pivots 73–76. The system, therefore, allows for considerable canting of the frame 41–44 relative to the platform 47. The operation of these cylinders 56–64 is substantially identical to that of the shifting cylinders of FIG. 1.

Finally in order to permit the frame 41–44 to twist and deform somewhat in the event that the platform 47 also deforms, the members 41 and 42 are formed as shown for member 41 in FIG. 4 of two parts 41a and 41b joined together at a joint 83 that allows them to pivot relative to each other about the longitudinal axis 81 of the member 41. FIG. 4 also shows how the frame 41–44 is supported on the outriggers 53 and 54 by means of slide blocks 21' carried on elements 21", so that shifting of the frame 41–44 when suspended on these outriggers 53–56 can take place without undue friction.

The system according to the instant invention has the considerable advantage that it allows the frame to deform considerably without damage to itself. At the same time the stepper can operate as effectively as any of the prior-art units, and can even be used in applications where, for example, due to uneven terrain, prior-art devices would not work at all. Since uneven displacement is permissible in the various shifting cylinders and in the various raising cylinders, it is possible to produce a stepper according to this invention at relatively low cost.

We claim:
1. A machine stepper comprising:
a machine-supporting platform having a plurality of fixed support posts by means of which said platform can stand on the ground; said support posts having normally ground-engaging lower ends;
a substantially rectangular frame underneath and shiftable relative to said platform, said frame being constituted by a pair of generally parallel longitudinal members and a pair of generally parallel transverse members connected at corners to said longitudinal members;
respective upright and vertically extensible legs at said corners having respective feet;
means including at each corner of said frame a leg pivot defining for the respective leg a horizontal pivot axis for preventing pivoting of the respective leg relative to said frame except about the respective horizontal pivot axis, two of said pivot axes extending longitudinally and the other two of said pivot axes extending transversely;

means for extending said legs between retracted positions with said feet above the level of said lower ends of said posts and extended positions with said feet below the level of said lower ends; and means for horizontally shifting said platform on said frame, whereby said platform and said posts can be raised off the ground by said legs in said extended positions and then said platform can be horizontally displaced relative to said frame and to the ground on which it stands by the shifting means.

2. The stepper defined in claim 1 wherein said members are pivoted together about upright pivot axes generally at said corners.

3. The stepper defined in claim 2 wherein each of said members has a long portion and a short portion, each corner having the long portion of one of the respective members and the short portion of the other respective member, said upright pivot axes interconnecting said long portions with the respective short portions.

4. The stepper defined in claim 3 wherein the short portion of one of said longitudinal members lies diagonally opposite the short portion of the other longitudinal member and the short portion of one of said transverse members lies diagonally opposite the short portion of the other transverse member.

5. The stepper defined in claim 2 wherein one of said pairs of members bears vertically directly on said platform and the other pair of members is out of contact with said platform and serves as link between the one pair of members, said legs bearing on said members of said one pair and being out of direct contact with said members of the other pair, the pivot axes of the legs on each of said members of said one pair being substantially perpendicular.

6. The stepper defined in claim 5 wherein said members of said one pair bearing on said platform each have two parts and a joint interconnecting same and permitting same to pivot relatively about the horizontal axes of the respective members.

7. The stepper defined in claim 6 wherein said parts of each of said members bearing on said platform are of unequal length and the pivot axis closest to each of the shorter of the two parts is perpendicular to the axis of the respective member bearing on said platform.

8. The stepper defined in claim 1, further comprising ball-type joints at said corners permitting limited horizontal tipping of said platform relative to said frame.

9. The stepper defined in claim 8 wherein said platform is provided with smooth-surface plates at said corners slidably engaging said ball-part joints.

* * * * *